United States Patent
Mann et al.

(10) Patent No.: US 7,639,832 B2
(45) Date of Patent: Dec. 29, 2009

(54) HEADPHONES

(75) Inventors: Wolfgang Mann, Isernhagen (DE); Axel Grell, Burgdorf (DE); Fred Koenecke, Nienhagen (DE)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 0 days.

(21) Appl. No.: 10/585,529

(22) PCT Filed: Jan. 10, 2005

(86) PCT No.: PCT/EP2005/000137
§ 371 (c)(1),
(2), (4) Date: May 10, 2007

(87) PCT Pub. No.: WO2005/067343
PCT Pub. Date: Jul. 21, 2005

(65) Prior Publication Data
US 2008/0049963 A1    Feb. 28, 2008

(30) Foreign Application Priority Data
Jan. 8, 2004 (DE) ................. 10 2004 001 442

(51) Int. Cl.
*H04R 25/00* (2006.01)
(52) U.S. Cl. .................... 381/384; 381/370
(58) Field of Classification Search .......... 439/38–40; 381/315, 370, 384; 320/107–115; 455/573, 455/575.2; 379/430
See application file for complete search history.

(56) References Cited

U.S. PATENT DOCUMENTS

| | | | | |
|---|---|---|---|---|
| 3,786,391 A | * | 1/1974 | Mathauser | 439/39 |
| 4,874,316 A | * | 10/1989 | Kamon et al. | 439/39 |
| 4,930,148 A | * | 5/1990 | Lee | 455/575.2 |
| 5,095,382 A | * | 3/1992 | Abe | 398/202 |
| 5,113,428 A | | 5/1992 | Fitzgerald | |
| 5,551,065 A | * | 8/1996 | Honore | 455/66.1 |
| 5,931,683 A | * | 8/1999 | Pinel | 439/39 |
| 6,230,029 B1 | * | 5/2001 | Hahn et al. | 455/575.2 |
| 7,182,604 B2 | * | 2/2007 | Ehr et al. | 439/38 |
| 2005/0212479 A1 | * | 9/2005 | Tsunoda | 320/114 |

FOREIGN PATENT DOCUMENTS

| | | |
|---|---|---|
| DE | 28 39 148 | 3/1980 |
| DE | 195 46 633 | 9/1997 |
| DE | 198 02 659 | 7/1999 |
| DE | 100 33 919 | 2/2002 |
| EP | 0 389 174 | 9/1990 |
| JP | 02248121 A * | 10/1990 |
| WO | WO 02/080504 | 10/2002 |

* cited by examiner

*Primary Examiner*—Curtis Kuntz
*Assistant Examiner*—Ryan C Robinson
(74) *Attorney, Agent, or Firm*—Reed Smith LLP (57) ABSTRACT

There is provided a wireless headphone having charging contacts in the headphone band and at least one magnet in the headphone band. There is also provided a charging station for a corresponding wireless headphone with bars as an electrical feed line for charge contacting of a wireless headphone.

2 Claims, 9 Drawing Sheets

HEADPHONES

CROSS-REFERENCE TO RELATED APPLICATIONS

This application claims priority of International Application No. PCT/EP2005/000137, filed Jan. 10, 2005 and German Application No. 10 2004 001 442.6, filed Jan. 8, 2004, the complete disclosures of which are hereby incorporated by reference.

BACKGROUND OF THE INVENTION a) Field of the Invention

The present invention concerns a headphone with a single-sided curved band suspension means and an inclined sound transducer arrangement. The invention further concerns a wireless headphone as well as a corresponding charging station for the wireless headphone and finally a wireless headphone system.

b) Problem of the Relevant Art

Wireless devices such as for example wireless headphones generally have a rechargeable battery. In order to recharge that battery the wireless headphone must have electrical contact surfaces which can be of a strongly or weakly resilient configuration. Strongly resilient contacts are often of relatively long dimensions. In the case of weakly resilient contacts however the contacts have to be brought together in positively locking relationship so that the battery can be correspondingly charged up.

OBJECT AND SUMMARY OF THE INVENTION

Accordingly the primary object of the present invention is to provide for secure electrical contacting for charging up battery-operated devices.

That object is attained by a wireless headphone in accordance with the invention, a charging station in accordance with the invention, a mobile terminal device in accordance with the invention and another charging station in accordance with the invention.

Thus there is provided a wireless headphone having charging contacts in the headphone band and at least one magnet in the headphone band. The invention also concerns a charging station for a corresponding wireless headphone. In that case the charging station has bars as an electrical feed line for electrical charge contacting of the wireless headphone.

The invention also concerns a mobile terminal device having a rechargeable battery, at least one charging contact for charging up the battery and a magnet in the region of the charging contacts. For charging up the mobile terminal device there is provided a charging station which has charging contacts and magnets in the region of the charging contacts.

The invention is based on the idea of providing for attraction between two electrical contact surfaces by magnetic attraction. In that case a magnet on one or both sides of the contact surfaces can provide for the necessary attraction.

In that way it is possible to enable a longer service life to be achieved as the contact springs are functionally more delicate and can easily bend. A magnetically boosted contacting effect makes it possible to achieve higher degrees of structural freedom. In addition contacting of that kind can take place independently of the position involved.

BRIEF DESCRIPTION OF THE DRAWINGS

FIGS. 1 through 10 show details of a wireless headphone system with a charging station and a wireless headphone.

FIGS. 11 through 13 show details of a headphone. FIGS. 11 through 13 show details of a second embodiment.

In more detail concerning the figures:

DESCRIPTION OF THE PREFERRED EMBODIMENTS

Figure 1:
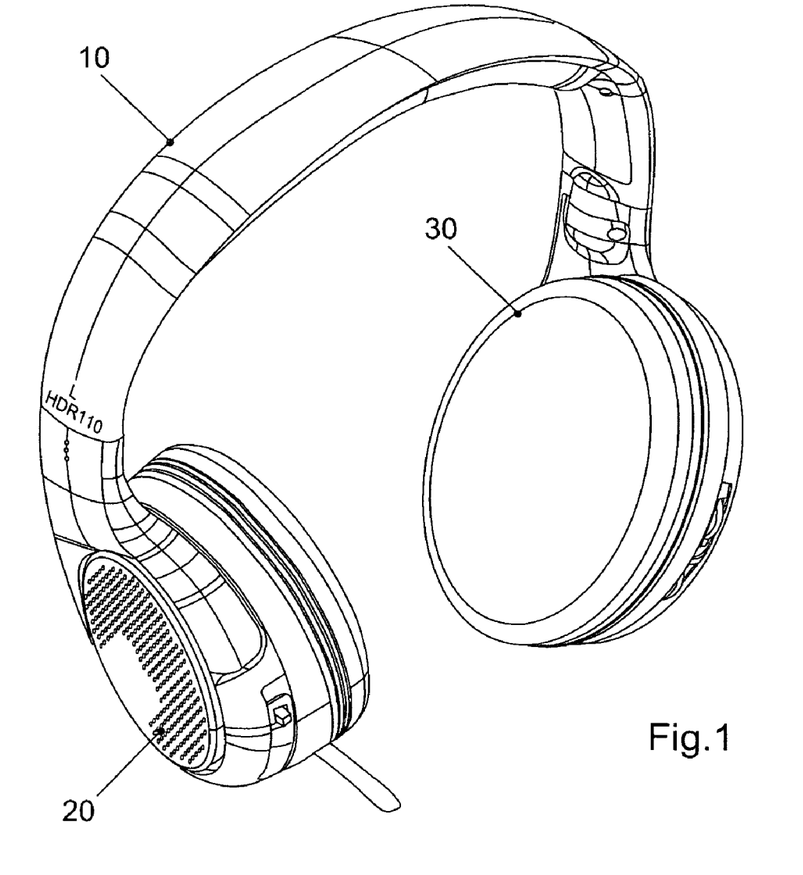
FIG. 1 is a plan view of a headphone in a first embodiment.

FIG. 1 shows a plan view of a headphone according to the first embodiment. In this case the headphone has two transducers 20, 30 and a headband 10.

Figure 2:
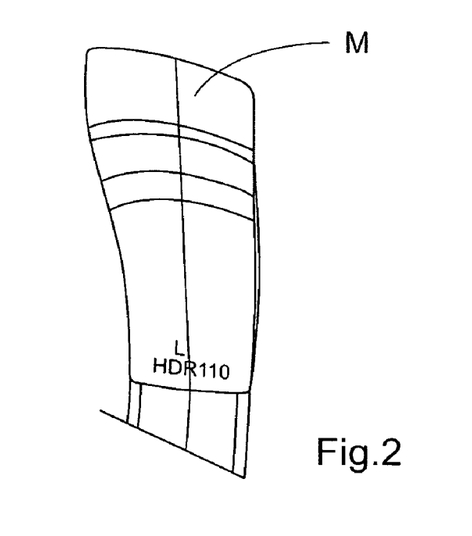
FIG. 2 is a side view of a headband shown in FIG. 1.

FIG. 2 shows a side view of a headband 10 of FIG. 1. Magnets M are arranged in the headband 10.

Figures 3, 4:
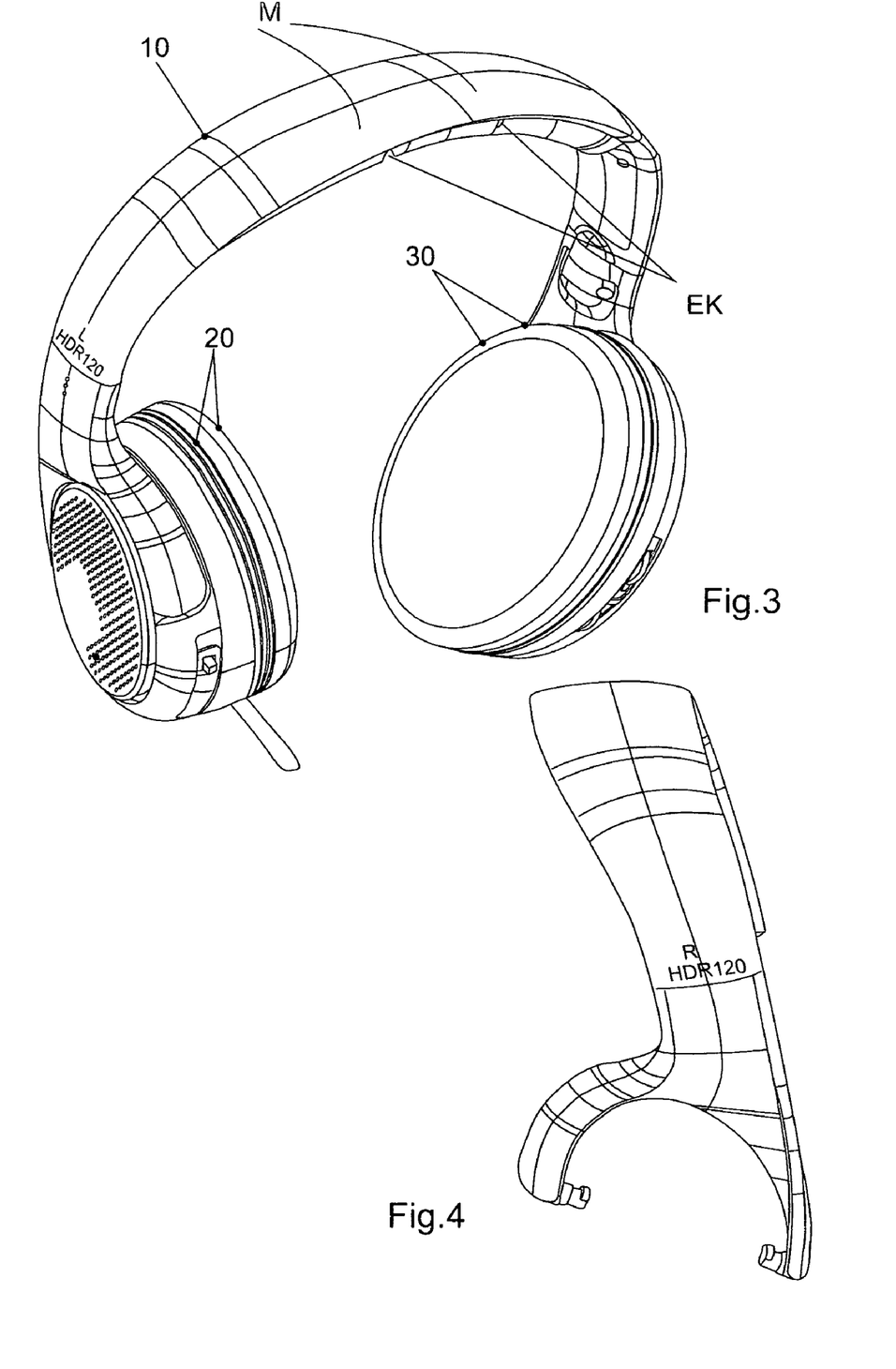
FIG. 3 illustrates a side view of the headphone of the first embodiment.
FIG. 4 shows a side view of a headphone of a headband of the headphone of FIG. 3.

FIG. 3 shows a side view of a headphone in accordance with the first embodiment. Both magnets M and also electrical contacts EK for charging up the headphone are arranged in the headband 10.

FIG. 4 shows a side view of a headband of the headphone of FIG. 3.

Figure 5:
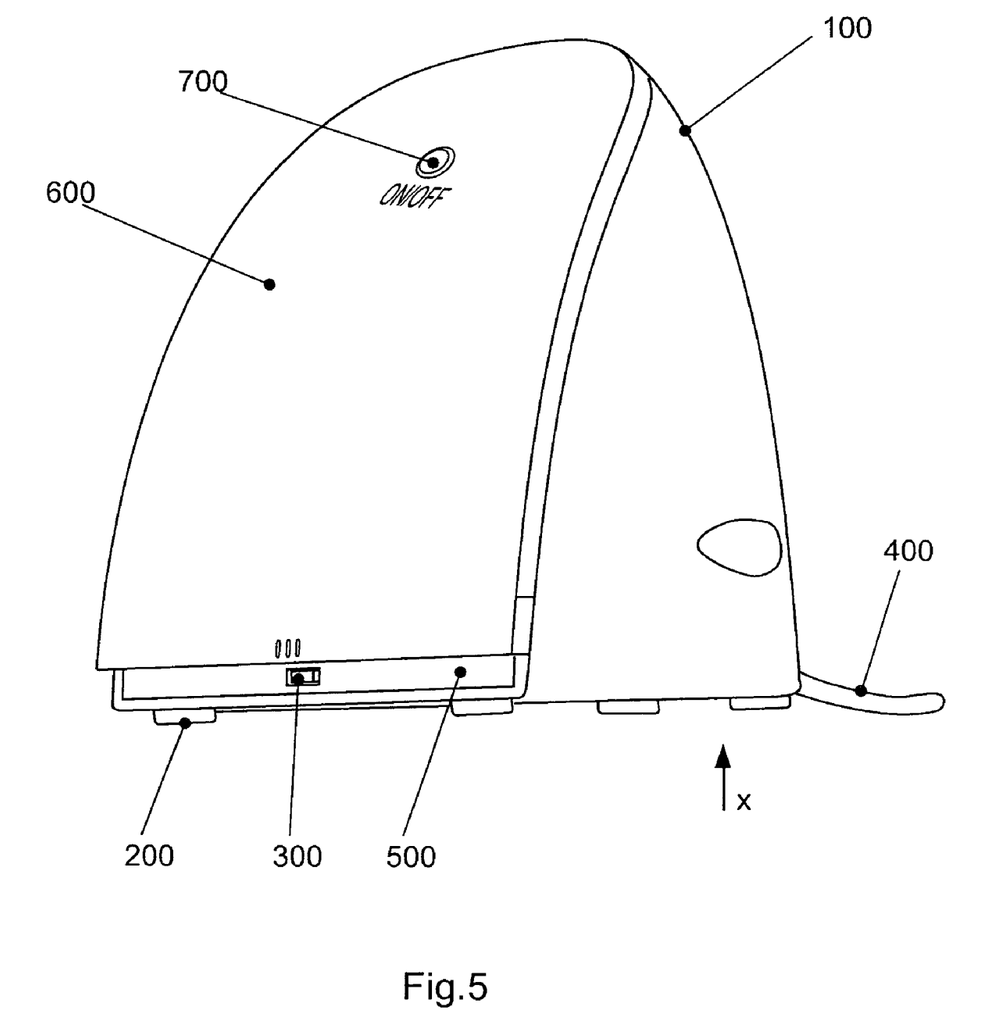
FIG. 5 is a perspective view of a charging station for a wireless headphone.

FIG. 5 shows a view of a charging station for a wireless headphone. The charging station 100 is connected to a voltage supply by way of a cable 400. Feet 200 are arranged at the underside of the charging station. The charging station can be switched on and off by means of an on/off switch 300.

Figure 6:
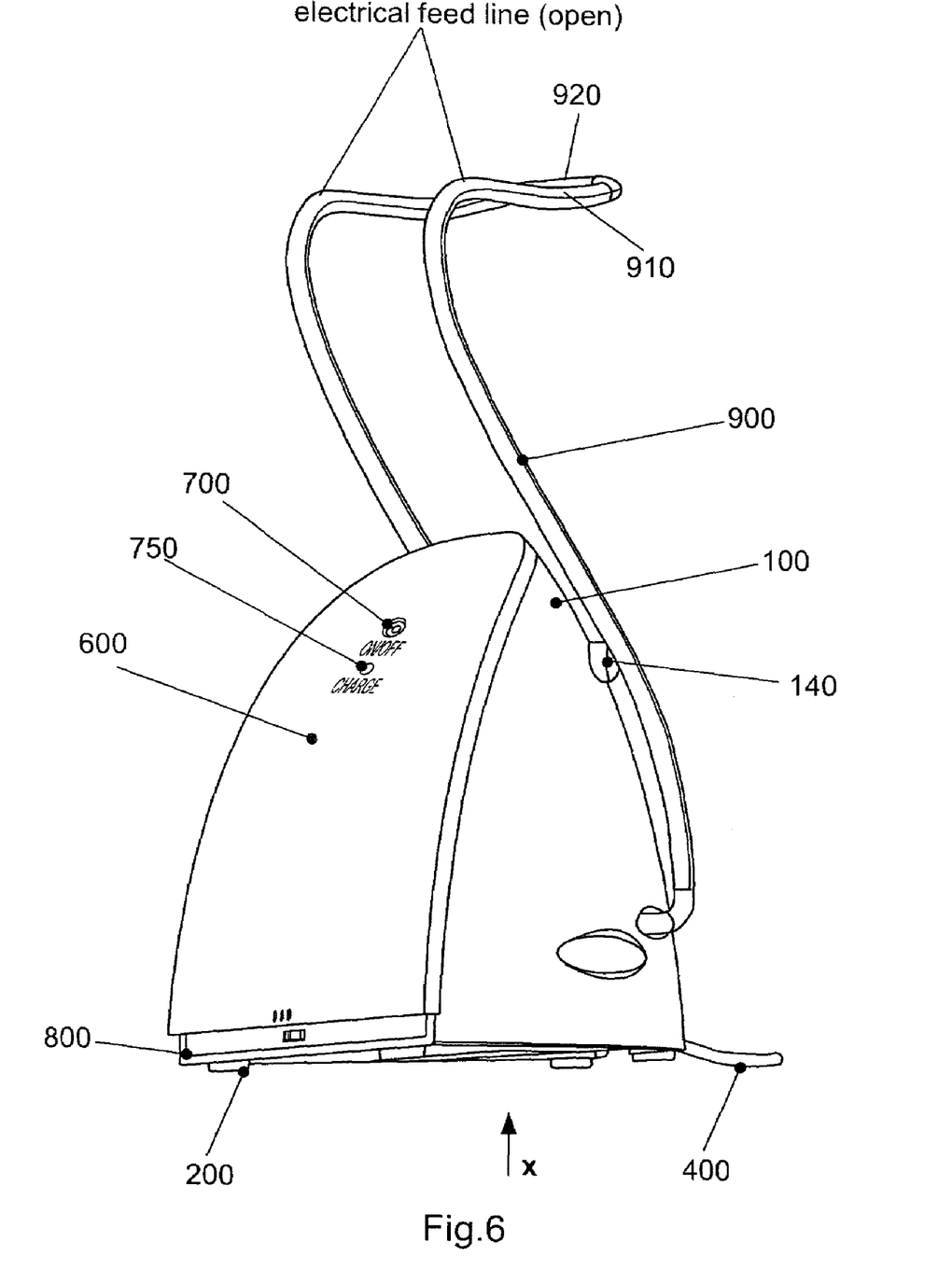
FIG. 6 is a plan view of a charging station in accordance with a first embodiment.

FIG. 6 also shows a plan view of a charging station in accordance with a first embodiment. In addition to the charging station as shown in FIG. 5 the charging station as shown in FIG. 6 has a bar 900 which serves for the electrical feed. Accordingly the bar 900 which for example in the form of an open electrical feed line has a region 910 which serves to receive a headband of a headphone as shown in one of FIGS. 1 and 2. There is also provided an insulated portion 920 on the feed line 900 in order to insulate the two electrical feed lines from each other.

To increase the stability of the feed line 900 a buffer element 140 (for example of rubber) can be arranged between the charging station 100 and the feed line 900.

Figure 7:
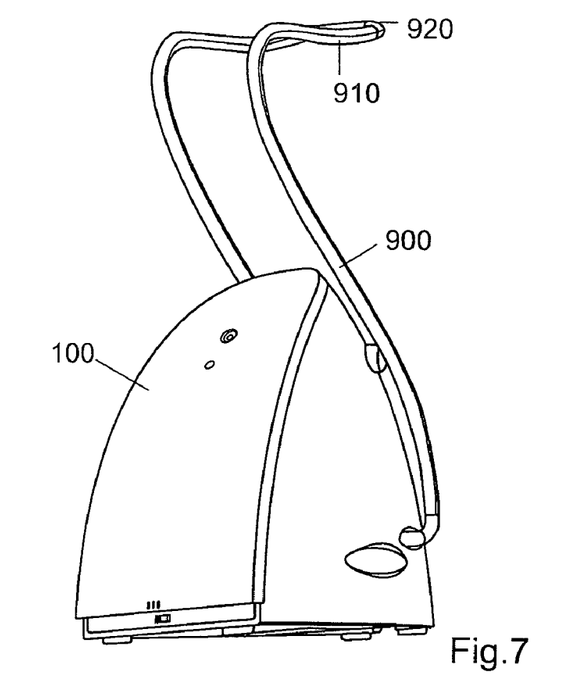
FIG. 7 shows a side view of a charging station as shown in FIG. 6.

FIG. 7 shows a further side view of a charging station as shown in FIG. 6.

Figure 8:
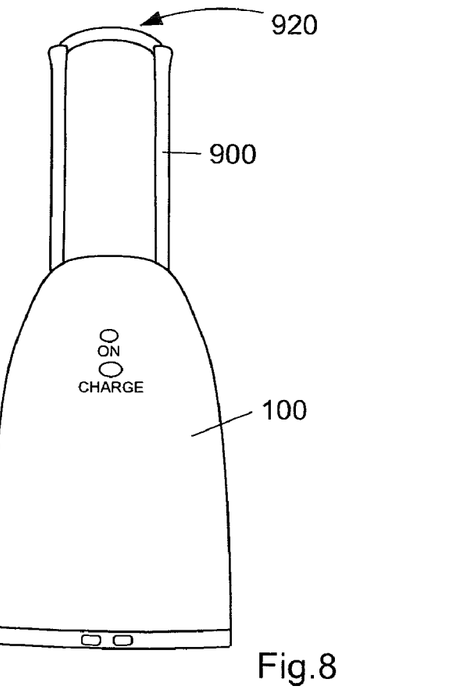
FIG. 8 shows a front view of a charging station from FIG. 6.

FIG. 8 shows a front view of a charging station from FIG. 6. Shown in this case is the charging station 100 as well as the feed line 900 with the insulated portion 920.

Figure 9:
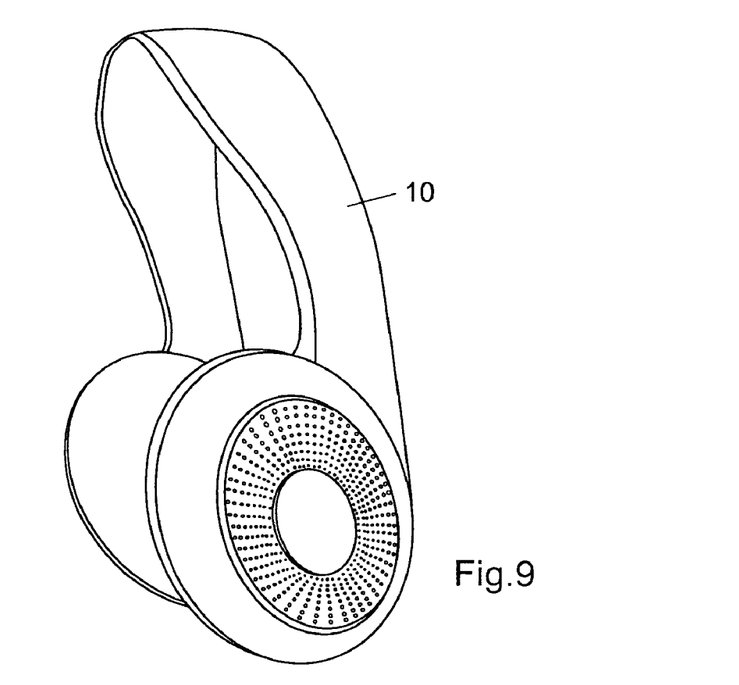
FIG. 9 illustrates a perspective view of a further headphone in accordance with the invention.

FIG. 9 shows a further headphone, in particular a wireless headphone, which can be used together with the charging station shown in FIGS. 6 through 8.

Figure 10:
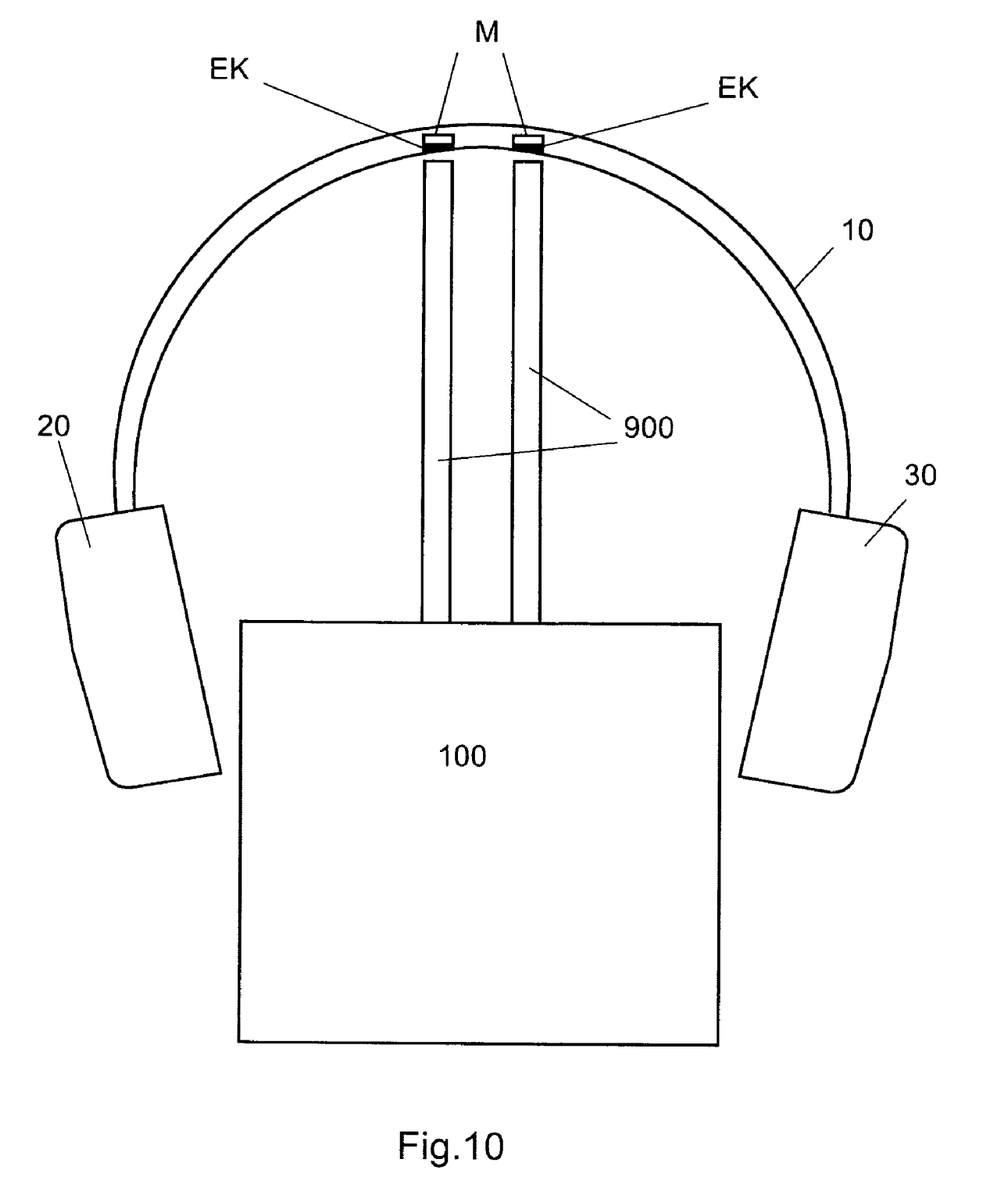
FIG. 10 is a diagrammatic view of a charging station with a corresponding headphone in a first embodiment.

FIG. 10 shows a diagrammatic view of a charging station 100 with a corresponding headphone in accordance with the first embodiment. The (in particular wireless) headphone has a band 10 with transducers 20, 30. Two electrical contacts EK are arranged at the underside of the band 10. Magnets M are arranged above the electrical contacts. Preferably the magnets and the electrical contacts are insulated from each other. In addition FIG. 10 shows a charging station having an electrical feed line 900. In this case the spacing between the electrical feed lines 900 and the electrical contacts EK in the band 10 of the headphone is such that, when the headphone is placed on the electrical feed line, the electrical contacts EK come into contact with the electrical feed line 900 so that the headphone or the batteries disposed therein can be charged up by way of the electrical feed line 900 and the electrical contacts EK.

That wireless headphone system is based on a novel charging concept in which the headband of the headphone is simply put into the charging device. Latching engagement does not have to be taken into consideration in that respect, and equally no consideration has to be given to right or left.

The wireless headphone is distinguished in that the charging contacts EK are preferably disposed in the headband at the middle of the headband 10. The headband 10 also has magnets M which are preferably disposed in the proximity of the electrical contacts EK.

In this case those magnets afford a magnet-boosted contact. Even if the electrical contacts in the headband are not placed exactly on the electrical feed lines or bars of the charging station, automatic placement of the contacts occurs due to the magnetic attraction of the magnets in the headband, that is to say the bars or electrical feed lines at least in portion-wise manner comprise magnetizable material.

The charging station 100 for the wireless headphone has two bars 900 which project out of the charging station. Those two bars serve as an electrical feed line for the electrical contacts EK in the wireless headphone. Consequently the spacing between the bars 900 at the free ends thereof must substantially correspond to the spacing of the electrical contacts EK in the headband of the headphone. The two bars 900 can also be connected together at their free ends if that connection is of an electrically insulating nature at 920.

The charging station can also serve as a transmitting/receiving station for the wireless headphone.

Alternatively the electrical contacts and the magnets can also be arranged in a neck band of a behind-the-head headphone.

The above-described principles of the invention, that is to say a magnetically boosted charging contact, can also be used for an inductive charging operation, that is to say without electrical contact, in which case fixing or the improvement thereof can be effected by means of magnets.

In the case of wireless headphones with a rechargeable battery the batteries are generally charged up by taking off the headphone and positioning the headphone on a suitable charging station. In general the batteries to be charged up do not have to be removed but electrical contacting is effected by way of contacts which are arranged both in the headphone and also in the charging station. As already described hereinbefore, resilient contacts are frequently used in order to ensure a good contacting action. If however reliable contact is to be produced by way of a weakly resilient contact surface, then the contacts must be brought together in positively locking relationship, such as for example by guides.

In accordance with the present invention a small magnet is arranged at the contact surfaces in the headphone so that the headphone rests securely on a charging loop of a charging station. In that case the holding force is determined by the configuration of the magnets. In that respect the contact surfaces do not necessarily have to be resilient.

As an alternative to the above-described embodiment a magnet-boosted contacting action can be achieved by the magnets being arranged at or in a feed line or at or in the charging loop of the charging station.

The underlying concept of the invention, namely magnet-boosted contacting of two electrical contacts for charging up a battery, can be applied not only to wireless headphones with the corresponding charging stations, but also to any mobile terminal devices and their charging stations (for example mobile telephones, PDAs, portable audio players, portable video players, portable games consoles etc), pocket calculators, portable dictating machines, pocket lamps, digital cameras which are supplied with power by rechargeable batteries. A corresponding consideration also applies to wireless microphones, pocket transmitters, in-ear headphones, hearing aids (in each case also wireless), cordless domestic appliances and all other electrical or electronic devices which have a rechargeable power source.

Figure 11:
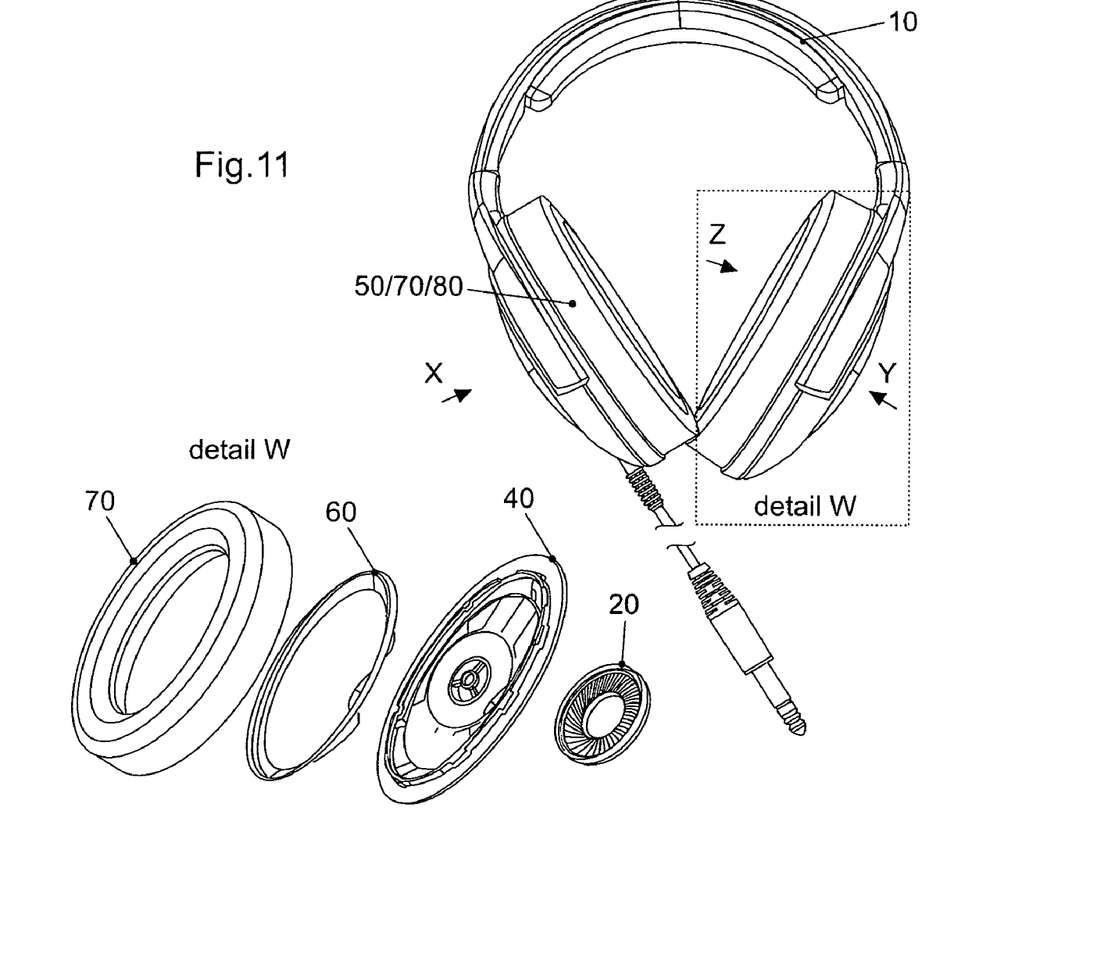
FIG. 11 shows several views of a headphone in a second embodiment.
Figure 12:
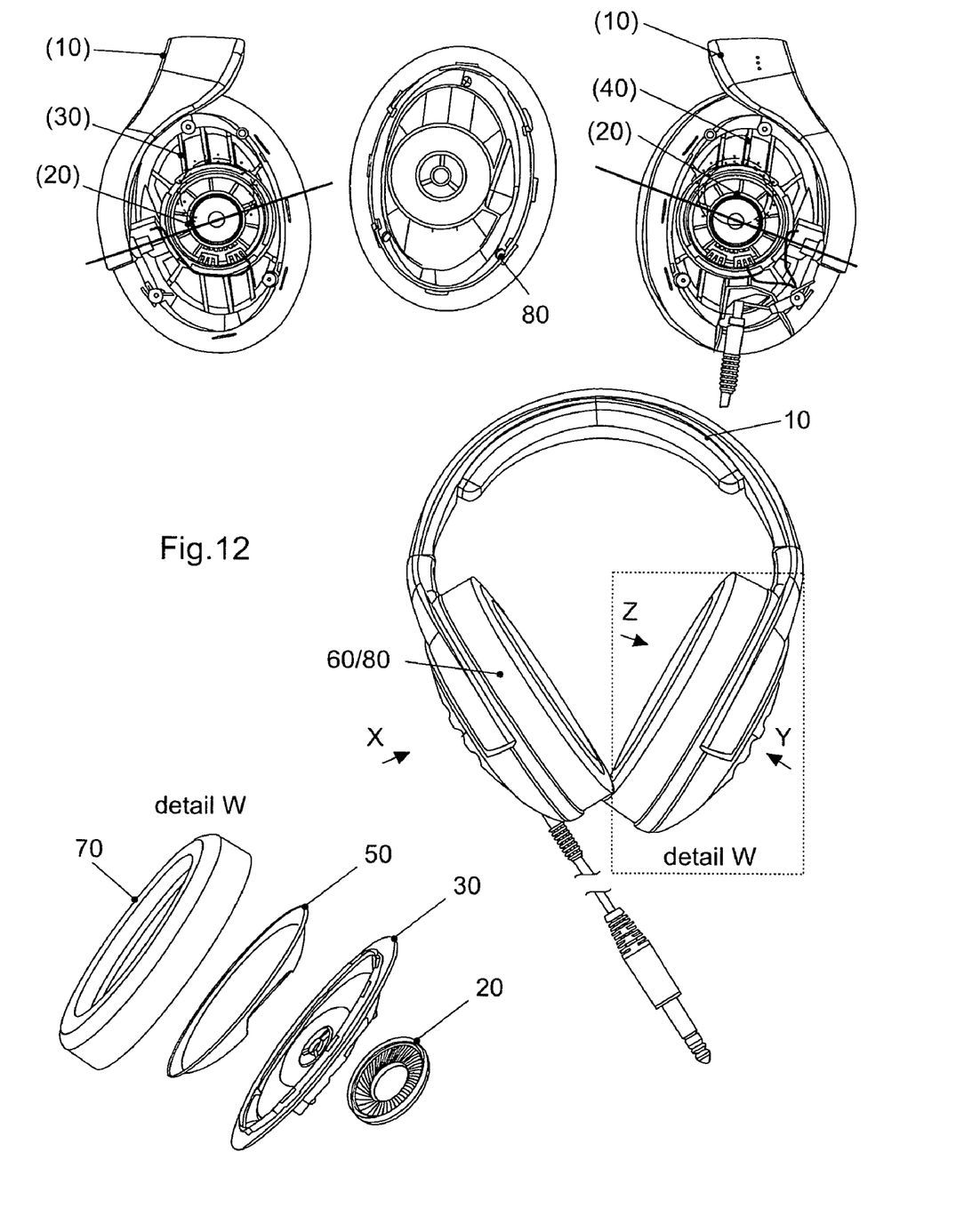
FIG. 12 shows further views of a headphone in the second embodiment.
Figure 13:
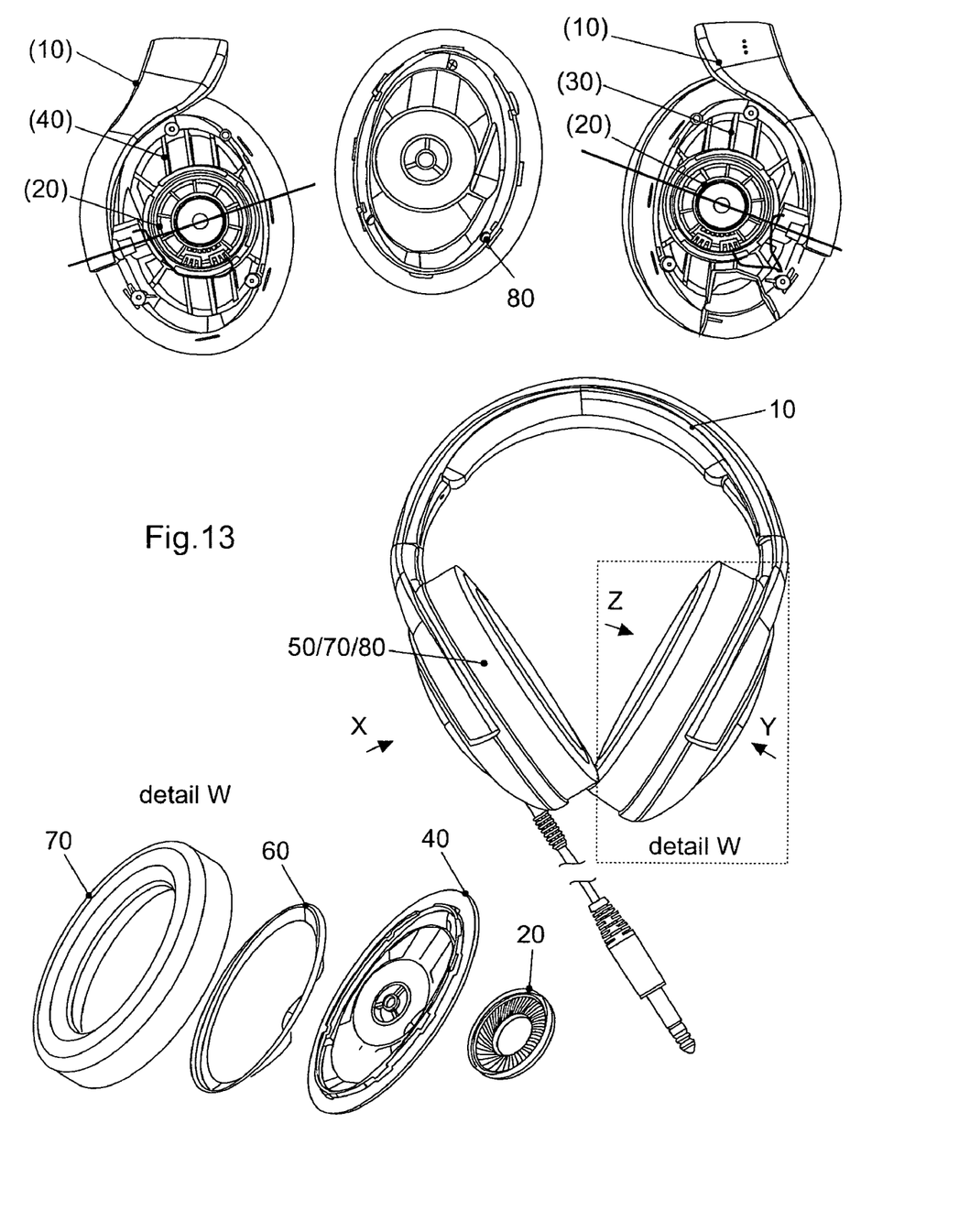
FIG. 13 shows still additional views of a headphone in the second embodiment.

FIGS. 11 through 13 show details of a headphone in accordance with a second embodiment. Inclined sound transducer arrangement is made possible by inclined positioning of the sound transducer arrangement.

The headphone with the band suspension means which is curved at one side and the inclined sound transducer arrangement permits ideal sound channelling with little resonance phenomena.

While the foregoing description and drawings represent the present invention, it will be obvious to those skilled in the art that various changes may be made therein without departing from the true spirit and scope of the present invention.

The invention claimed is:

1. A wireless headphone system comprising:
   a wireless headphone having a headphone band, electrical charging contacts in the headphone band, and at least one magnet in the headphone band, wherein the magnet and the electrical charging contact are associated with each other for charge contacting; and
   a charging station for the wireless headphone having a housing and two bars projecting out of the housing, wherein each bar comprises a first and second end, wherein the bars at the first ends are coupled to the housing and the bars at the second ends are rigid, extend in a substantially horizontal manner for receiving the headband of the wireless headphone, and are connected by an insulated portion, wherein the bars serve as an electrical feed line, and wherein the horizontal section comprises electrical contacts for electrically contacting the electrical charging contacts in the headphone band.

2. Charging station for a wireless headphone having a headphone band and electrical charging contacts in the headphone band, said charging station comprising:
   a housing; and
   bars projecting out of the housing, wherein each bar comprises a first and second end, wherein the bars at the first ends are coupled to the housing and the bars at the second ends are rigid, extend in a substantially horizontal manner for receiving the headband of the headphone, and are connected by an insulated portion, wherein the horizontal section comprises electrical contacts for electrically contacting the electrical charging contacts in the headphone band.

* * * * *

UNITED STATES PATENT AND TRADEMARK OFFICE
CERTIFICATE OF CORRECTION

| | | |
|---|---|---|
| PATENT NO. | : 7,639,832 B2 | Page 1 of 1 |
| APPLICATION NO. | : 10/585529 | |
| DATED | : December 29, 2009 | |
| INVENTOR(S) | : Wolfgang Mann | |

It is certified that error appears in the above-identified patent and that said Letters Patent is hereby corrected as shown below:

Column 1, line 22, "as for example wireless headphones generally" should read "as, for example, wireless headphones, generally"

Column 1, line 24, "that battery the" should read "that battery, the"

Column 1, line 27, "however the" should read "however, the"

Column 1, line 60 (as identified in the patent), "In addition contacting" should read "In addition, contacting"

Column 3, line 61 (as identified in the patent), "If however reliable" should read "If, however, reliable"

Signed and Sealed this
Thirteenth Day of September, 2011

David J. Kappos
*Director of the United States Patent and Trademark Office*